US008891606B2

(12) United States Patent
Kent et al.

(10) Patent No.: US 8,891,606 B2
(45) Date of Patent: *Nov. 18, 2014

(54) METHOD AND SYSTEM FOR LOW COMPLEXITY CONJUGATE GRADIENT BASED EQUALIZATION IN A WIRELESS SYSTEM

(71) Applicant: Broadcom Corporation, Irvine, CA (US)

(72) Inventors: Mark Kent, Vista, CA (US); Uri Landau, San Diego, CA (US); Severine Catreux-Erceg, Cardiff, CA (US); Vinko Erceg, Cardiff, CA (US); Ning Kong, La Jolla, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,047

(22) Filed: Dec. 31, 2012

(65) Prior Publication Data

US 2013/0128945 A1  May 23, 2013

Related U.S. Application Data

(63) Continuation of application No. 13/192,773, filed on Jul. 28, 2011, now Pat. No. 8,351,556, which is a (Continued)

(51) Int. Cl.
*H03K 5/159* (2006.01)
(Continued)

(52) U.S. Cl.
CPC .... *H04B 7/0413* (2013.01); *H04L 2025/03662* (2013.01); *H04L 2025/03617* (2013.01);
(Continued)

(58) Field of Classification Search
CPC .............. H04L 25/03057; H04L 25/03038; H04L 2025/0349; H04L 27/2647; H04B 1/1027
USPC .......... 375/232, 229, 233, 316, 346, 348, 350
See application file for complete search history.

(56) References Cited

U.S. PATENT DOCUMENTS 5,852,630 A  12/1998 Langberg et al.
5,946,351 A  8/1999 Ariyavisitakul et al.
(Continued)

FOREIGN PATENT DOCUMENTS

WO  WO 02/091643  11/2002

OTHER PUBLICATIONS

Haykin, S., McMaster University, Sellathurai, M., de Jong, Y., and Willink, T., Communications Research Centre Canada, Adaptive Antennas and MIMO Systems for Wireless Communications, "Turbo-MIMO for Wireless Communications," IEEE Communications Magazine, Oct. 2004, pp. 48-53.

(Continued)

*Primary Examiner* — Ted Wang
(74) *Attorney, Agent, or Firm* — Sterne, Kessler, Goldstein & Fox P.L.L.C.

(57) ABSTRACT

Methods and systems for processing signals in a receiver are disclosed herein and may include updating a plurality of filter taps utilizing at least one channel response vector and at least one correlation vector, for a plurality of received clusters, based on initialized values related to the at least one channel response vector and the at least one correlation vector. At least a portion of the received signal clusters may be filtered utilizing at least a portion of the updated plurality of filter taps. The update may be repeated whenever a specified signal-to-noise ratio (SNR) for the received signal clusters is reached. The initialized values may be updated during a plurality of iterations, and the update may be repeated whenever a specified number of the plurality of iterations is reached.

20 Claims, 5 Drawing Sheets

Related U.S. Application Data continuation of application No. 12/940,150, filed on Nov. 5, 2010, now Pat. No. 8,000,424, which is a continuation of application No. 11/565,365, filed on Nov. 30, 2006, now Pat. No. 7,856,052, which is a continuation-in-part of application No. 11/173,502, filed on Jun. 30, 2005.

(60) Provisional application No. 60/616,895, filed on Oct. 6, 2004.

(51) Int. Cl.
*H04B 7/04* (2006.01)
*H03H 7/30* (2006.01)
*H03H 7/40* (2006.01)
*H04L 25/03* (2006.01)

(52) U.S. Cl.
CPC . *H04L 2025/03426* (2013.01); *H04L 2025/037* (2013.01); *H04L 2025/03471* (2013.01); *H04L 25/03038* (2013.01)
USPC .......... 375/232; 375/229; 375/233; 375/316; 375/346; 375/348; 375/350

(56) References Cited

U.S. PATENT DOCUMENTS

| | | | |
|---|---|---|---|
| 6,128,276 | A | 10/2000 | Agee |
| 6,724,809 | B2 | 4/2004 | Reznik |
| 6,816,541 | B1 | 11/2004 | Schmidl |
| 6,868,276 | B2 | 3/2005 | Nissila |
| 7,028,232 | B2 | 4/2006 | Kyosti et al. |
| 7,130,342 | B2 | 10/2006 | Buckley et al. |
| 7,302,023 | B2 | 11/2007 | Yang |
| 7,352,799 | B2 | 4/2008 | Pajukoski |
| 7,359,734 | B2 | 4/2008 | Ylitalo |
| 2003/0016737 | A1* | 1/2003 | Wu et al. .................. 375/224 |
| 2003/0031234 | A1 | 2/2003 | Smee et al. |
| 2005/0243898 | A1 | 11/2005 | Reznik et al. |
| 2006/0062284 | A1 | 3/2006 | Li et al. |
| 2006/0072449 | A1 | 4/2006 | Kent et al. |
| 2007/0015545 | A1 | 1/2007 | Leifer et al. |
| 2007/0047678 | A1* | 3/2007 | Sibecas et al. ............. 375/343 |

OTHER PUBLICATIONS

Love, D.J. et al., Purdue University, Heath, R.W., Jr., University of Texas at Austin and Santipach, W. and Honig, M.L., Northwestern University; Adaptive Antennas and MIMO Systems for Wireless Communications, "What is the Value of Limited Feedback for MIMO Channels?," IEEE Communications Magazine, Oct. 2004, pp. 54-59.

Mietzner, J. and Hoeher, P.A., University of Kiel, Adaptive Antennas and MIMO Systems for Wireless Communications, "Boosting the Performance of Wireless Communications Systems: Theory and Practice of Multiple-Antenna Techniques," IEEE Communications Magazine, Oct. 2004, pp. 40-47.

Nosratinia, A., University of Texas, Dallas, Hunter, T.E., Nortel Networks, Hedayat, A., University of Texas, Dallas, "Cooperative Communication in Wireless Networks," IEEE Communication Magazine, Oct. 2004, pp. 74-80.

Sanayei, S. and Nosratinia, A., University of Texas at Dallas, Adaptive Antennas and MIMO Systems for Wireless Communications, "Antenna Selection in MIMO Systems," IEEE Communications Magazine, Oct. 2004, pp. 68-73.

Spencer, Q., Distribution Control Systems, Inc., Peel, C.B., Swiss Federal Institute of Technology, Swindlehurst, A.L., Brigham Young University, Haardt, M., Ilmenau University of Technology, Adaptive Antennas and MIMO Systems for Wireless Communications, "An Introduction to the Multi-User MIMO Downlink," IEEE Communications Magazine, Oct. 2004, pp. 60-67.

Non-Final Office Action, dated Sep. 30, 2008, for U.S. Appl. No. 11/713,502, filed Jun. 30, 2005; 16 pages.

Final Office Action, dated Mar. 16, 2009, U.S. Appl. No. 11/173,502, filed Jun. 30, 2005; 13 pages.

Non-Final Office Action, dated Oct. 5, 2009, for U.S. Appl. No. 11/173,502, filed Jun. 30, 2005; 14 pages.

Final Office Action, dated Apr. 27, 2010, for U.S. Appl. No. 11/173,502, filed Jun. 30, 2005; 23 pages.

Non-Final Office Action, dated Sep. 28, 2009, for U.S. Appl. No. 11/565,365, filed Nov. 30, 2006; 8 pages.

Non-Final Office Action, dated Mar. 19, 2010, for U.S. Appl. No. 11/565,365, filed Nov. 30, 2006; 7 pages.

Notice of Allowance, dated Aug. 5, 2010, for U.S. Appl. No. 11/565,365, filed Nov. 30, 2006; 6 pages.

Notice of Allowance, dated Apr. 18, 2011, for U.S. Appl. No. 12/940,150, filed Nov. 5, 2010; 8 pages.

* cited by examiner

METHOD AND SYSTEM FOR LOW COMPLEXITY CONJUGATE GRADIENT BASED EQUALIZATION IN A WIRELESS SYSTEM

CROSS-REFERENCE TO RELATED APPLICATIONS/INCORPORATION BY REFERENCE

The present application is a continuation of U.S. application Ser. No. 13/192,773, filed Jul. 28, 2011, which is a continuation of U.S. application Ser. No. 12/940,150, filed on Nov. 5, 2010, which is a continuation of U.S. application Ser. No. 11/565,365, filed on Nov. 30, 2006, which is a continuation-in-part of application Ser. No. 11/173,502, filed on Jun. 30, 2005, which claims priority to provisional Application No 60/616,895, filed on Oct. 6, 2004. The above-referenced United States patent applications are all hereby incorporated herein by reference in their entirety. This application is also related to the following applications, each of which is incorporated herein by reference in its entirety:

U.S. patent application Ser. No. 11/565,381 filed on Nov. 30, 2006;
U.S. patent application Ser. No. 11/173,870 filed on Oct. 6, 2004;
U.S. patent application Ser. No. 11/174,303 filed on Oct. 6, 2004;
U.S. patent application Ser. No. 11/173,502 filed on Oct. 6, 2004; and
U.S. patent application Ser. No. 11/173,854 filed on Oct. 6, 2004.

FIELD OF THE INVENTION

Certain embodiments of the invention relate to processing received wireless signals. More specifically, certain embodiments of the invention relate to a method and system for low complexity conjugate gradient based equalization in a wireless system.

BACKGROUND OF THE INVENTION

In most current wireless communication systems, nodes in the network may be configured to operate based on a single transmit and a single receive antenna. However, for many current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, code division multiple access (CDMA) based systems, time division multiple access (TDMA) based systems, wireless local area network (WLAN) systems, and orthogonal frequency division multiplexing (OFDM) based systems, such as IEEE 802.11 a/g, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from the shift underway from current voice-based services to next-generation wireless multimedia services that provide integrated voice, video, and data transmission.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of M−1 interferers. Accordingly, N signals may be simultaneously transmitted in the same bandwidth using N transmit antennas, with the transmitted signal then being separated into N respective signals by way of a set of N antennas deployed at the receiver.

This type of systems may be referred to as multiple-input multiple-output (MIMO) systems. One attractive aspect of multi-antenna systems, in particular MIMOs, is the significant increase in system capacity which may be achieved by utilizing these transmission configurations. For a fixed overall transmitted power the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from the increased size, complexity, and power consumption. Providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

Furthermore, multi-path propagation in band-limited time dispersive channels may cause inter-symbol interference (ISI), which has been recognized as a major obstacle in achieving increased digital transmission rates with the required accuracy. ISI may occur when the transmitted pulses are smeared out so that pulses that correspond to different symbols are not discernable or separable. Meanwhile, data received from a desired user may be disturbed by other transmitters, due to imperfections in the multiple access scheme, giving rise to inter-carrier interference (ICI). For a reliable digital transmission system, it is desirable to reduce the effects of ISI and ICI.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and method for low complexity conjugate gradient based equalization in a wireless system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for low complexity conjugate gradient based equalization in a wireless system and may comprise updating a plurality of filter taps of the equalizing filter utilizing at least one channel response vector, and at least one correlation vector, for a plurality of received clusters. The updating of the equalizing filter taps may be based on initialized values related to the channel response vector and the correlation vector. At least a portion of the received signal clusters may be filtered utilizing at least a portion of the updated plurality of filter taps. A signal cluster may be defined as plurality of signals that are sampled and synchronized with the receiver chip-rate clock (or fraction of chip-rate period). Each sample constitutes an estimate of the received signal that propagated a different path (channel). The update may be repeated whenever a specified signal-to-noise ratio (SNR) for the received signal clusters is reached. The initialized values may be updated during a plurality of iterations, and the update may be repeated whenever a specified number of the plurality of iterations is reached. A plurality of chip-rate synchronously sampled signals may be generated utilizing the plurality of received clusters and/or a chip clocking signal. The correlation vector may be generated utilizing the plurality of chip-rate synchronously sampled signals, and may comprise complex conjugates of a plurality of chip-rate synchronously sampled signals. The plurality of chip-rate synchronously sampled signals may be generated based on the plurality of received clusters. The channel response vector and the correlation vector may be updated based on a minimum-mean-square-error (MMSE) algorithm. An estimate of the plurality of received clusters may be generated based on the filtering.

Figure 1:
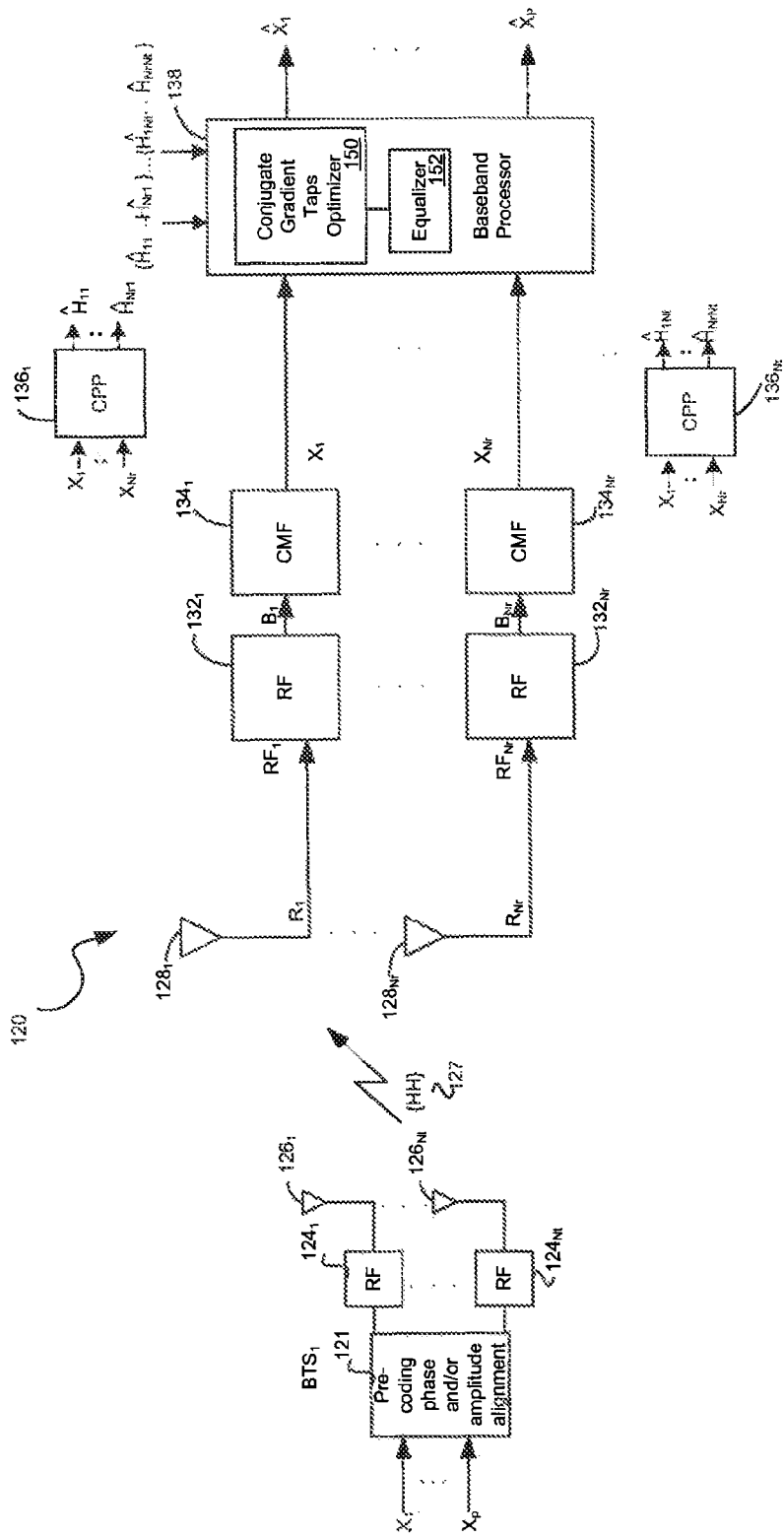
FIG. 1 is a block diagram of an exemplary spatial multiplexing (SM) multiple-input multiple-output (MIMO) antenna system utilizing a conjugate gradient taps optimizer, in accordance with an embodiment of the invention.

FIG. 1 is a block diagram of an exemplary spatial multiplexing (SM) multiple-input multiple-output (MIMO) antenna system utilizing a conjugate gradient taps optimizer, in accordance with an embodiment of the invention. Referring to FIG. 1, there is shown a transceiver system 120 that may comprise a baseband transmit station (BTS) BTS1, a plurality of receive antennas $128_{1 \ldots Nr}$, a plurality of radio frequency (RF) receive blocks $132_{1 \ldots Nr}$, a plurality of chip matched filters (CMF) $134_{1 \ldots Nr}$, a plurality of cluster path processors (CPP) $136_{1 \ldots Nr}$, and a baseband processor 138.

On the transmit side, the baseband transmit station BTS1 may comprise pre-coding phase and/or amplitude alignment block 121, $N_t$ number of RF transmit blocks $124_{1 \ldots Nt}$, and N number of antennas $126_{1 \ldots Nt}$ for the BTS1. The BTS1 may transmit one or more spatially multiplexed signals over channels having actual time varying impulse responses. The total time varying impulse response 127 of all receive and transmit channels utilized within the transceiver system 120 may correspond to the channel matrix HH. In one aspect of the invention, the BTS1 may utilize spatial multiplexing techniques to transmit one or more signals utilizing the transmit antennas $126_{1 \ldots Nt}$ which correspond to BTS1. However, the invention may not be limited in this regard. For example, the transmit side may comprise additional baseband transmit stations and one or more antennas from other BTSs may be utilized during the same transmission of the spatially multiplexed signal. Or alternatively, the BTS1 may utilize transmit diversity techniques to transmit one or more signals utilizing a—coding phase and/or amplitude alignment block 121 and the transmit antennas $126_{1 \ldots Nt}$.

The RF transmit blocks $124_{1 \ldots Nt}$ may comprise suitable logic, circuitry, and/or code that may be adapted to process an RF signal. The RF transmit blocks $124_{1 \ldots Nt}$ may perform, for example, filtering, amplification, and/or analog-to-digital (A/D) conversion operations. The plurality of transmit antennas $126_{1 \ldots Nt}$ may transmit the processed RF signals from the plurality of RF transmit blocks $124_{1 \ldots Nt}$ to a plurality of receive antennas $128_{1 \ldots Nr}$.

The plurality of RF receive blocks $132_{1 \ldots Nr}$ may comprise suitable logic, circuitry and/or code that may be adapted to amplify and convert the received analog RF signals $R_{1 \ldots Nr}$ down to baseband frequency. The plurality of RF receive blocks $132_{1 \ldots Nr}$ may each comprise an analog-to-digital (A/D) converter that may be utilized to digitize the received analog baseband signal, as well as voltage controlled oscillator, a mixer, and/or a low pass filter.

The plurality of chip matched filters (CMF) $134_{1 \ldots Nr}$ may comprise suitable logic, circuitry, and/or code that may be adapted to filter outputs of the plurality of RF receive blocks $132_{1 \ldots Nr}$ so as to produce in-phase (I) and quadrature (Q) components. In this regard, in an embodiment of the invention, the plurality of chip matched filters (CMF) $134_{1 \ldots Nr}$ may comprise a pair of digital filters, for example, that may be adapted to filter the I and Q components to within the bandwidth of WCDMA baseband, for example 3.84 MHz.

The plurality of cluster path processors (CPP) $136_{1 \ldots Nt}$ may be adapted to generate a plurality of Nr×Nt channel estimates of the actual time varying impulse responses. A $CPP_i$ (i=1 ... Nt) generates the channel estimates $\hat{H}_{li}, \ldots \hat{H}_{Nri}$ received at antennas $R_{1 \ldots Nr}$. The baseband processor 138 may be adapted to receive a plurality of in-phase ($I_i$) and quadrature ($Q_i$) are components of $X_i$ (i=1 ... $N_r$) Output from the plurality of chip-matched filters (CMF) $134_{1 \ldots Nr}$. Block 138 also receives the estimates $\hat{H}_{1i}, \ldots \hat{H}_{Nri}$. The baseband processor 138 may then generate a plurality of estimates $\hat{X}_1$ to $\hat{X}_P$ of the original input signals $X_1$ to $X_P$ per baseband transmit station.

In operation, the transceiver system 120 may receive wireless signals, which may be distorted due to fading effect and other distorting phenomena. In this regard, the baseband processor 138 may utilize signal equalizing, or filtering, to reverse the effect of the communication channel or media interferences. In an exemplary embodiment of the invention, the baseband processor 138 may also comprise one or more conjugate gradient taps optimizer blocks (CGTO) 150 and one or more equalizers 152. The CGTO 150 may comprise suitable circuitry, logic and/or code and may utilize a conjugate gradient-based algorithm to calculate one or more equalizer filter tap settings. The calculated equalizer taps may be used by the equalizer 152 to equalize or filter the received signal estimate. The equalizer 152 may also update an error function at a given rate, while the conjugate gradient-based algorithm in the CGTO 150 may continuously iterate, for example a plurality of cycles for each update, so that the equalizer taps may be updated and optimized by the CGTO 150 for the received wireless signal. In another embodiment of the invention, the algorithm used by the CGTO 150 may be based on a Minimum Mean Square Error (MMSE) algorithm. In this regard, the CGTO 150 may utilize a reduced number of calculation cycles, for example by eliminating matrix-vector multiplication, which may result in increased processing time and reduced implementation costs.

Figure 2:
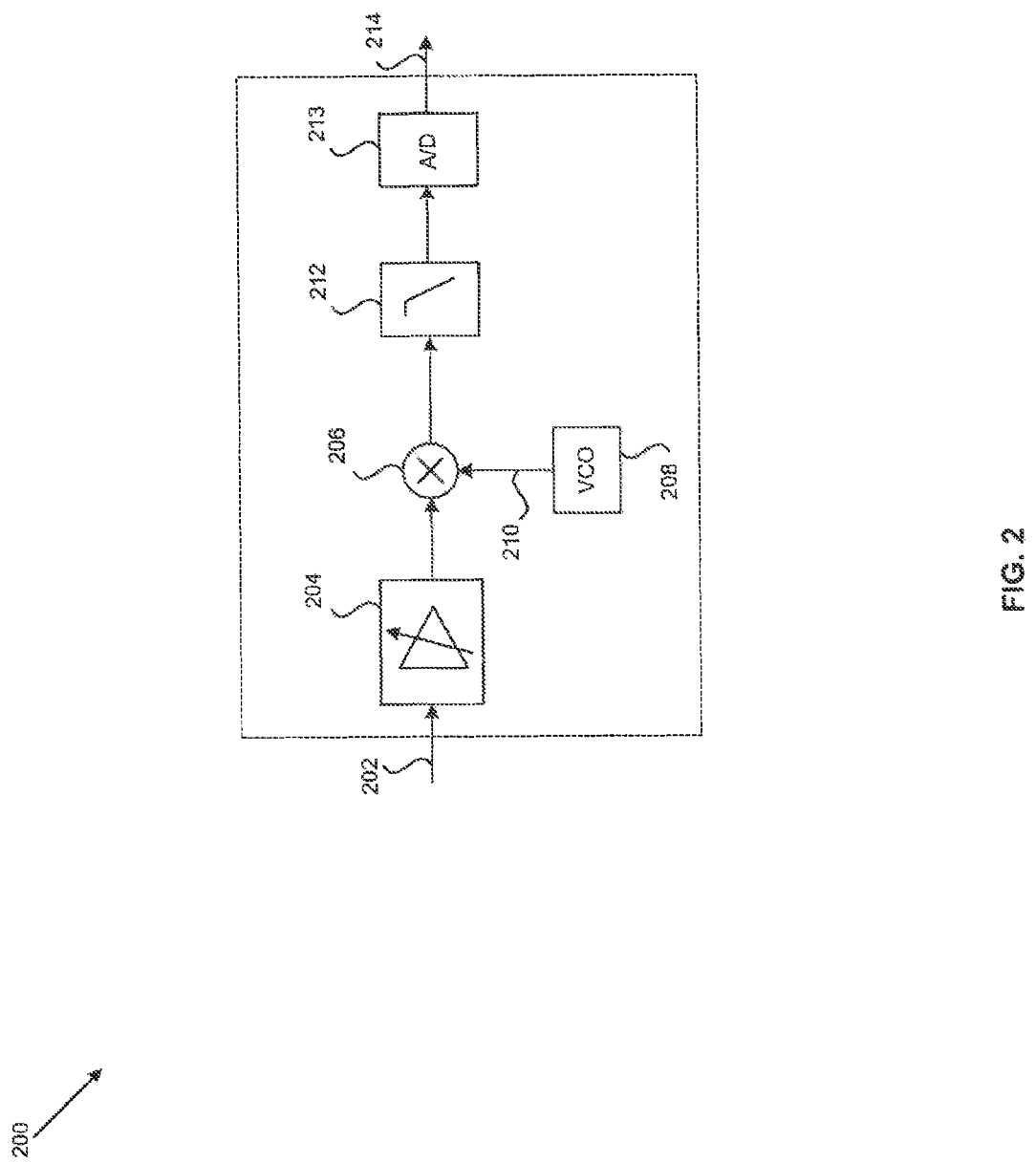
FIG. 2 is a block diagram of a radio frequency (RF) processing block that may be utilized in accordance with an aspect of the invention.

FIG. 2 is a block diagram of a radio frequency (RF) processing block that may be utilized in accordance with an aspect of the invention. Referring to FIG. 2, the RF processing block 200 may comprise suitable logic, circuitry, and/or code and may be adapted to amplify and convert the received analog RF signal down to baseband and then digitize it. In an exemplary aspect of the invention, the RF processing block 200 may comprise an LNA 204, a voltage controlled oscillator (VCO) 208, a mixer 206, a low pass filter (LPF) 212, and an analog-to-digital converter (A/D) 213. The LNA 204 may be adapted to receive an RF signal 202 and amplify it based on a determined gain level. The VCO 208 may comprise suitable logic, circuitry, and/or code and may be adapted to output a signal of a specific frequency, which may be pre-determined, or controlled, by a voltage signal input to the VCO. The VCO signal 210 may be mixed by the mixer 206 with the amplified signal received from the LNA 204. The LPF 212 may comprise suitable logic, circuitry, and/or code and may be adapted to receive the mixed signal from the mixer 206. The frequencies of the mixed signal may be limited by the LPF 212 to a determined range of frequencies up to a certain upper frequency limit, and the LPF 212 may output that range of frequencies as a baseband signal to the A/D 213. The A/D converter 213 may comprise suitable logic, circuitry, and/or code that may be adapted to receive the limited analog baseband signal from the LPF 212 and output a digital signal 214, which may sample the analog signal at a pre-defined rate.

Figure 3:
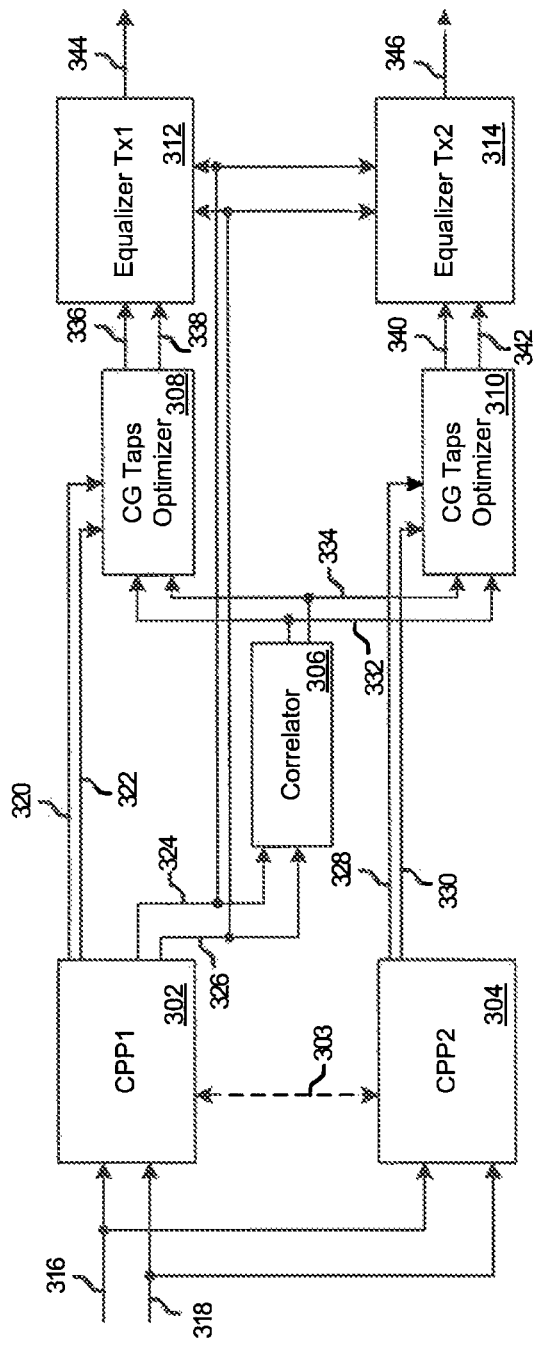
FIG. 3 is a block diagram of a receiver front end of a two-transmit-two-receive MIMO antenna system utilizing conjugate gradient optimization, in accordance with an embodiment of the invention.

FIG. 3 is an exemplary block diagram described in FIG. 1. It shows the block diagram of a receiver front end of a two-transmit-two-receive (Nt=2; Nr=2) MIMO antenna-system utilizing conjugate gradient optimization, in accordance with an embodiment of the invention. Referring to FIG. 3, there is illustrated a receiver front end comprising cluster path processors CPP1 302 and CPP2 304, a correlator block 306, CGTO blocks 308 and 310, and equalizer blocks 312 and 314.

The CPPs 302 and 304 may comprise suitable circuitry, logic and/or code and may enable the generation of the channel estimates ($\hat{H}_{11}$, $\hat{H}_{12}$, $\hat{H}_{21}$, $\hat{H}_{22}$). A designated CPP named Master CCP (302) provides the chip-rate (or multiple chip-rate) clocking signal to the entire receiver. It facilitates the removing of the time-tracking circuitry from all the other CPP's and the generation of timely synchronous outputs (the channels estimates) from all the CPP's. Furthermore, the Master CPP (302) receives signals from each CPP (304) that indicate the strength of the aggregate channels (for example, measured by the mean power of all channels) and the aggregate time position—of the channels processed—relative to the Master CPP clocking signal. The Master CPP (302) is equipped with circuitry/software that facilitates a clocking-signal that tracks the aggregate received timing and power signals from all CPP's in a manner and accuracy that is required. In this respect the connection 303—between the Master CPP 302 and CPP 304—facilitates the flow of time, power signals, and may include other information, to the Master CPP. Block 302, also, outputs the timing signals, through 303, to the entire receiver. The channel response estimates ($\hat{H}_{11}$, $\hat{H}_{12}$, $\hat{H}_{21}$, $\hat{H}_{22}$) 320, 328, 322, 330 and the signals X'1 324 and X'2 326—from CPPs 302 and 304—may be fully synchronized in a sense of being sampled by a single clock.

The correlator block 306 may comprise suitable circuitry, logic and/or code and may enable generation of correlation vectors 332 and 334 of the two receive antennas, based on the generated chip-rate synchronously sampled signals X'1 326 and X'2 324 received from the time-master CPP 302. The correlation vectors 332 may comprise correlations R11 and R12, and correlation vectors 334 may comprise correlations R21 and R22.

The CGTO blocks 308 and 310 may comprise suitable circuitry, logic and/or code and may enable generating and updating of equalizer tap values 336, . . . , 342, based on, for example, a conjugate gradient-based algorithm. The generated equalizer tap values 336, . . . , 342 may be communicated to the equalizer blocks 312 and 314 for further processing.

The equalizer blocks 312 and 314 may comprise suitable circuitry, logic and/or code and may generate received signal estimates 344 and 346 based on the generated chip-rate synchronously sampled signals X'1 326 and X'2 324 and the updated equalizer taps 336, . . . , 342.

In operation, the CPPs 302 and 304 may receive input signal X1 316 from a first antenna, and input signal X2 318 from a second antenna. The received signals 316 and 318 may have been transmitted from two transmit antennas. The CPP 302 may generate channel responses $\hat{H}_{11}$ 320 and $\hat{H}_{21}$ 322, based on received wireless signals X1 316 and X2 318 received via two receive antennas. The received signals may be represented as $X_r$ (r=1:2). The CPP 304 may generate channel responses $\hat{H}_{12}$ 328 and $\hat{H}_{22}$ 330, also based on input wireless signals X1 316 and X2 318. Each channel response $\hat{H}_{ri}$ (i=1:2, r=1:2) may comprise a vector of $N_{CH}$ taps, where $N_{CH}$ may comprise the delay spread of the channel. The generated channel responses $\hat{H}_{11}$ 320 and $\hat{H}_{21}$ 322 may be communicated to CGTO 308, and the generate channel responses $\hat{H}_{12}$ 328 and $\hat{H}_{22}$ 330 may be communicated to the CGTO 310.

The coming signal may be transmitted through two transmit antennas and may be received by two receiver antennas first, and then may be processed by two CPP's (Cluster Path Processes) 302 and 304. Each CPP-i (i=1,2) 302, 304 may generate a plurality of channel response—$\hat{H}_{ri}$ (r=1:2) 320, 322, 328, 330 of the desired signal, where each channel response may comprise a vector of Nch taps, and Nch may be the delay spread of the channel.

As explained before, the CPP 302 may be defined as the time-master CPP and may be utilized to receive timing signals from all the other CPP's and may generate the chip clocking signal. This chip clock or other time signal, which may comprise multiple chip clock-time, may be used to sample the input signals Xr (r=1:2) 316, 318, creating the output X1' 316 and X2' 318 and the channel responses—$\hat{H}_{ri}$ (r=1:2; i=1:2) 320, 322, 328, 330, as well as other generated signals. The received signals Xr (r=1:2) 316, 318 that clocked at chip rate may be further processed in the correlate-generator 306 block that may generate the vector set of correlations {Rr1,r2} 332, 334. Each vector Rr1,r2 (r1=1:NR; r2=1:NR) may comprise the correlation taps that are given by the following equation:

$$Rr1,r2(n) = E\{Xr1 \cdot X^*r1-n\},$$

where n=0:Nch-1 and "*" is the complex conjugate.

The correlation set {Rr1,r2(n);} 332, 334 together with the set of channel responses vectors $\hat{H}_{ri}$ (r=1:2; i=1:2) 320, 322, 328, 330 may be input into the CG-i (i=1:2) 308, 310 that may generate the equalizer taps (w_cg). The taps may be updated according to changes in the channel estimates the SNR and other conditions described within the context of this invention.

The CG tape-optimizer blocks 308, 310 may utilize the CG algorithm described herein below as well as with regard to FIG. 5, and may use MMSE criteria, for example. One or more modifications related to this algorithm may also be utilized, such as initialization/re initialization block, control block for the number of iteration, and/or block that estimates the convergence status.

In an exemplary embodiment of the invention, the CGTO blocks 308 and 310 may utilize a conjugate gradient-based (CG) algorithm for generating and updating the equalizer taps 336, . . . , 342. The CG algorithm may be expressed by the following pseudo code:

---
STEP 1
---
```
If initialization_flag
    alf         = alf_0
    bet         = bet_0
    w_cg        = zeros(2*M,1);
end
```
STEP 2
---
```
If updating_clk
    r       = h;
    p       = r;
        R       = R_in;
end
```
STEP 3
---
```
If Iteration_clk & iteration_flg
    Rp          = R*p;
    r_curr      = r'*r;
    pRp         = p'*Rp;
    w_cg        = w_cg + alf*p;
    r           = h – R*w_cg;
    p           = r + bet*p;
        nm_iter     = nm_iter + 1;
end
```
STEP 4
---
```
snr_cg      = Get_CG_SNR(w_cg, H);
```
STEP 5
---
```
if (snr_cg <snr_0) & (iter_flag == 0)
    w_cg        = h;
    iter_flag   = 1;
    nm_iter     = 0;
elseif snr_cg <snr_1
    if nm_iter < N_iterations
        update alf;
        update bet;
    else
        iteration_flg = 0;
    end
end
```
---

During an exemplary equalizer tap calculation in accordance with the above algorithm, at step 1, the algorithm parameters alf and bet may be initialized to alf_0 and bet_0. The initial desired solution w_cg may also be initialized to a zero-vector. The algorithm parameters alf and bet may be expressed by the following equations:

$$alf_k = r^T_{k-1} r_{k-1} / p^T_{k-1} R p_{k-1}; \text{ and}$$

$$bet_k = p^T_{k-1} A\ r_{k-1} / p^T_{k-1} R p_{k-1},$$

where $r_k$ may comprise a vector of dimension N, calculated at the $k^{th}$ iteration, $p_k$ may comprise a vector of the same dimension, calculated at the $k^{th}$ iteration, and R may comprise an array of N×N dimension. Therefore, each calculation iteration may utilize $N^2+3\times N$ multiplications and 2 division operations. In this regard, calculation complexity of the CG algorithm may be significantly reduced by presetting values alf_0 and bet_0 to the alf and bet parameters. The alf_0 and bet_0 values may be pre-calculated and used in the CG algorithm. In addition, the values may be dynamically exchanged during execution of the CG algorithm, based on pre-defined conditions. For example, such pre-defined conditions may be characterized by the Signal-to-Noise-Ratio (SNR). For example, the algorithm parameters alf and bet may be associated with a range of SNR values that may be measured during signal reception, and the algorithm parameters alf and bet may be reset if such SNR value is achieved. In other instances, the algorithm parameters alf and bet may be set to a desired value, which may be determined in offline testing.

During step 2 of the CG algorithm, the external conditions may be updated. In this regard, the channel response vectors H11, H12, H21, and H22 (represented by h), as well as the correlations vectors r11, r12, r21, and r22 (represent by Rin) may be input. During step 3, one iteration of the CG algorithm may be performed, if the number of iteration is less than the value N_iteration. During step 4, evaluation of the equalizer taps may be performed by calculating the SNR value. During step 5, the estimated SNR decisions related to a subsequent cycle may take place. The value snr_0 may represent a level of signal/noise when the algorithm may be ineffective and therefore may not be used. The value snr_1 may define a higher level SNR where the improvement to performance may be diminishing and therefore the algorithm may not be applied. In this regard, the CG algorithm may be effective for a range of SNR values.

For example, if snr<snr_0, the CG algorithm may output h and the equalizer blocks 312 and 314 may operate as maximum ratio combiners. The CG algorithm may then be initialized to new iteration sets. If snr<snr_1 and if the number of iteration performed is less than N_iteration, another cycle of the CG algorithm may be performed. Otherwise, the CG algorithm may halt until the next updating cycle. Within a given SNR range, the number of cycles N that the CG algorithm may be applied may be deduced. The CG algorithm, however, may not be limited to any pre-defined range of SNR values. Consequently, the algorithm parameters N, alf, and bet may be determined for a plurality of SNR ranges. It is known, to one skilled in the art, that the chosen N—the dimension (the number of taps) of w_cg the equalizer filters may be at the range of twice to four time the delay spread (measured in number of chips—$N_{ch}$ that defines the channel response). However the calculated correlation vectors r11, r12, r21, and r22 (Also called R11, R12, R21 and R22 and are the outputs 334 and 332) may be limited to the delay spread $N_{CH}$. The assigning the correlation vectors to larger vectors the non defined value are replaced with zeros. The implementation of this invention, therefore, may include limitation on the calculation of the inner products, between two vectors, to only non zero values and therefore reducing the calculation and the complexity load.

Figure 4:
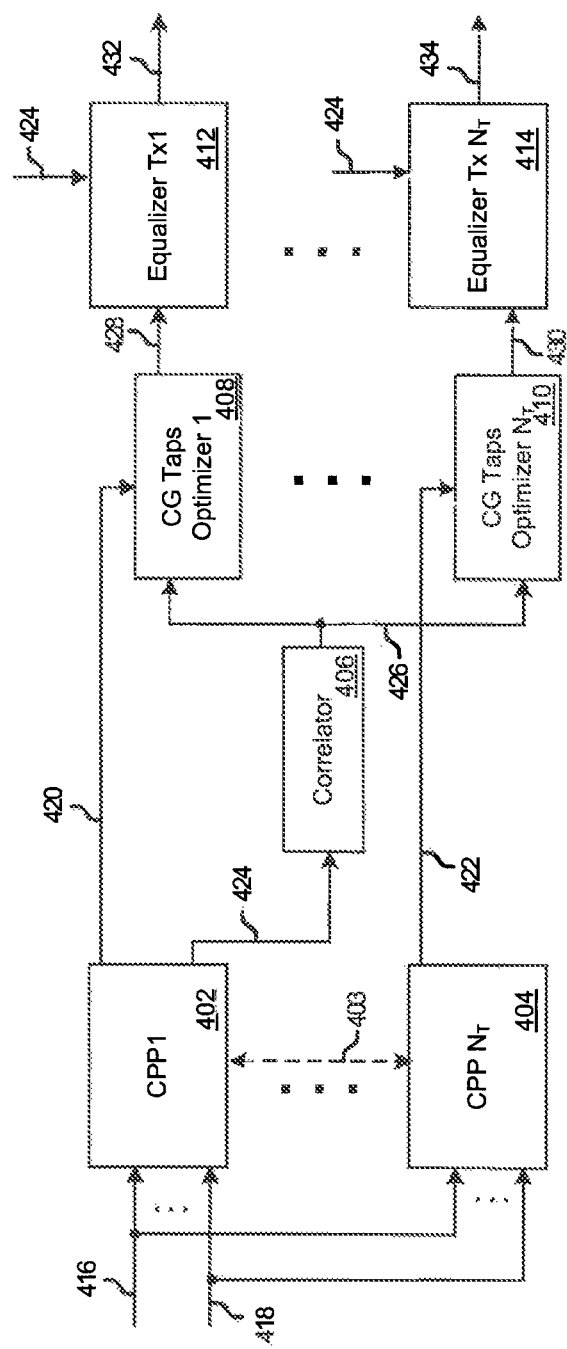
FIG. 4 is a block diagram of a receiver front end of a multiple-transmit-multiple-receive MIMO antenna system utilizing conjugate gradient optimization, in accordance with an embodiment of the invention.

FIG. 4 is a block diagram of a receiver front end of a multiple-transmit-multiple-receive MIMO antenna system utilizing conjugate gradient optimization, in accordance with an embodiment of the invention. It is the architecture in the general case of Nt transmitters or antennas and Nr receivers. Referring to FIG. 4, there is illustrated a receiver front end comprising cluster path processors $CPP_1 \ldots N_r$ 402, . . . , 404, a correlator block 406, CGTO blocks 408, ..., 410, and equalizer blocks 412, ..., 414. The input wireless signals 416, ..., 418 may be transmitted by Nt transmit antennas and received by Nr receive antennas.

In operation, the CPPs 402, ..., 404 may receive input signals 416, ..., 418 Xr (r=1:Nr) via Nr receive antennas. The CPPs 402, ..., 404 may generate channel responses $H_{r,i}$ (r=1:Nr; i=1:Nt) based on the received wireless signals 416, ..., 418. Each channel response $H_{r,i}$ may comprise a vector of $N_{CH}$ taps, where $N_{CH}$ may comprise the delay spread of the channel. The generated channel responses 420, ..., 422 $H_{r,i}$ (r=1:Nr; i=1:Nt) may be communicated to CGTO blocks 408, ..., 410.

The CPP 402 may receive a plurality of timing signals 403 from each remaining CPP, and may generate chip-rate synchronously sampled signals $X_{1...Nr}$ 424, based on the input signals 416, ..., 418. The chip-rate synchronously sampled signals $X_{1...Nr}$ 424 may be communicated to the correlator block 406. The correlator block 406 may generate vector set of correlation values $\{R_{r1,r2}\}$ 426 of the Nr receive antennas, based on the generated chip-rate synchronously sampled signals $X_{1...Nr}$ 424 received from the time-master CPP 402. The vector set of correlations $\{R_{r1,r2}\}$ 426 may comprise individual vectors. Each individual vector $R_{r1,r2}$ (r1=1:Nr, r2=1:Nr) may comprise correlation taps which may be represented by the following equation:

$$R_{r1,r2}(n) = E\{X_{r1} \cdot X^*_{r2-n}\},$$

where n=0:$N_{ch}$-1 and "*" may represent a complex conjugate. The correlation set $\{R_{r1,r2}(n)\}$ 426 and the set of channel responses vectors $H_{r,i}$ (r=1:Nr; i=1:Nt) may be communicated to the CGTO blocks 408, ..., 410. The CGTO blocks 408, ..., 410 may generate the equalizer taps 428, ..., 430 for the equalizer blocks 412, ..., 414, and may continuously update them. The equalizer blocks 412, ..., 414 may generate received signal estimates 432, ..., 434 based on the generated chip-rate synchronously sampled signals $X_{1...Nr}$ 424 and the updated equalizer taps 428, ..., 430.

Figure 5:
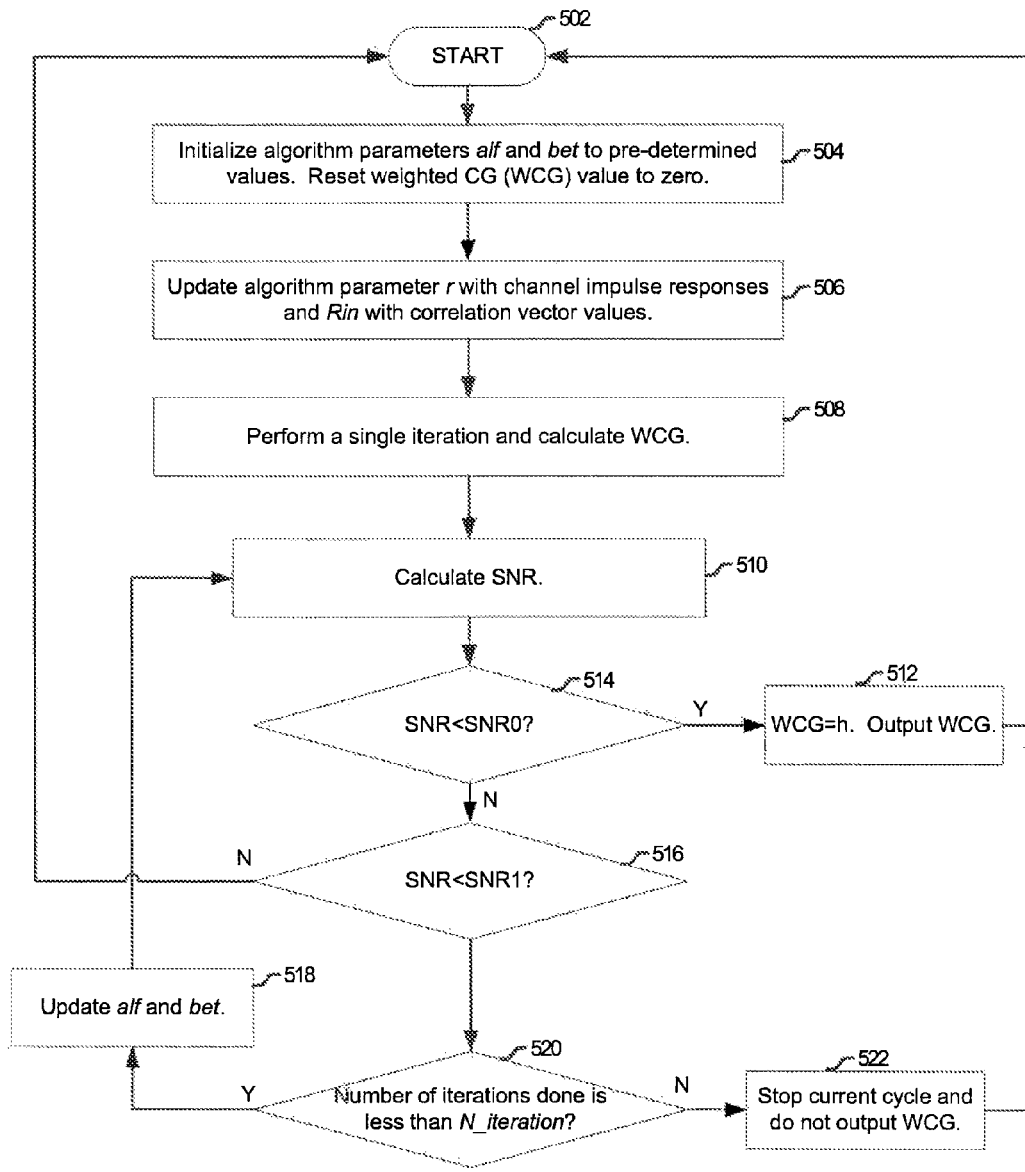
FIG. 5 is a flow diagram illustrating exemplary steps for processing signals in a receiver, in accordance with an embodiment of the invention.

FIG. 5 is a flow diagram illustrating exemplary steps for processing signals in a receiver, in accordance with an embodiment of the invention. Referring to FIG. 5, there is shown a flow diagram of the exemplary CG algorithm, as described above with regard to FIG. 3. The exemplary steps may begin at step 502. At 504, the algorithm parameters alf and bet may be initialized to pre-determined values. The weighted conjugate gradient (WCG) value may be reset to zero. At 506, the algorithm parameter r may be updated with channel impulse responses, and algorithm parameter $R_{in}$ may be updated with correlation vector values. At 508, a single iteration may be performed by the CG algorithm and WCG may be calculated.

At 510, a signal-to-noise ratio (SNR) may be calculated. At 514, it may be determined whether the calculated SNR is less than snr_0. If SNR<snr_0, then at 512, WCG may be determined as h, and the determined WCG may be output. The algorithm may then resume at step 502. If SNR is not less than snr_0, at 516, it may be determined whether SNR<snr_1. If SNR is not less than snr_1, the algorithm may reset and start again at step 502. If SNR<snr_1, at 520, it may be determined whether the number of performed iterations is less than the value of N_iterations. If the number of performed iterations is less than the value of N_iterations, at 518, the algorithm parameters alf and bet may be updated. The algorithm may then reset and continue at step 502. If the number of performed iterations is not less than the value of N_iterations, at 522, the current algorithm cycle may be stopped and no WCG value may be output. The CG algorithm may then reset and continue at step 502.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing wireless signals, comprising:
   receiving first and second wireless signals comprising information transmitted from one or more transmit antennas;
   generating a correlation vector that corresponds to said first wireless signal correlated with a complex conjugate of said second wireless signal; and
   updating an equalizer tap according to said correlation vector upon determining that a signal-to-noise ratio (SNR) requirement is satisfied.

2. The method of claim 1, further comprising generating said equalizer tap according to a channel response vector that corresponds to the combination of a receive antenna and a transmit antenna.

3. The method of claim 1, wherein said equalizer tap is updated iteratively while the SNR requirement is satisfied.

4. The method of claim 1, wherein said equalizer tap is updated a pre-determined number of times.

5. The method of claim 1, further comprising generating a chip-rate synchronously sampled signal based on a chip clocking signal and at least one of said first and second wireless signals.

6. The method of claim 5, further comprising generating a received signal estimate based on said generated chip-rate synchronously sampled signal.

7. The method of claim 5, wherein the correlation vector is generated using the chip-rate synchronously sampled signal.

8. The method of claim 1, wherein said first and second wireless signals comprise a signal cluster.

9. The method of claim 1, wherein said equalizer tap is updated according to a conjugate gradient based on said correlation vector.

10. The method of claim 1, wherein said SNR requirement is determined to be satisfied when said SNR falls within a predetermined range.

11. A system for processing wireless signals, comprising:
one or more receive ports configured to receive first and second wireless signals comprising information transmitted from one or more transmit antennas;
a correlator configured to generate a correlation vector that corresponds to said first wireless signal correlated with a complex conjugate of said second wireless signal; and
a conjugate gradiant tap optimizer (CGTO) configured to update an equalizer tap according to said correlation vector upon determining that a signal-to-noise ratio (SNR) requirement is satisfied.

12. The system of claim 11, wherein said CGTO is configured to generate said equalizer tap according to a channel response vector that corresponds to the combination of a receive antenna and a transmit antenna.

13. The system of claim 11, wherein said CGTO is configured to update said equalizer tap iteratively while the SNR requirement is satisfied.

14. The system of claim 11, wherein said CGTO is configured to update said equalizer tap a pre-determined number of times.

15. The system of claim 11, wherein said correlator is configured to generate a chip-rate synchronously sampled signal based on a chip clocking signal and at least one of said first and second wireless signals.

16. The system of claim 15, wherein said correlator is configured to generate a received signal estimate based on said generated chip-rate synchronously sampled signal.

17. The system of claim 15, wherein said correlator is configured to generate said correlation vector using the chip-rate synchronously sampled signal.

18. The system of claim 11, wherein said first and second wireless signals comprise a signal cluster.

19. The system of claim 11, wherein said CGTO is configured to update said equalizer tap according to a conjugate gradient based on said correlation vector.

20. The method of claim 11, wherein said CGTO is configured to determine that said SNR requirement is satisfied when said SNR falls within a predetermined range.

* * * * *